United States Patent
Tawara

(10) Patent No.: US 7,250,755 B2
(45) Date of Patent: Jul. 31, 2007

(54) MAGNETIC VARIATION SENSOR FOR DETECTION OF VARIATION IN MAGNETIC FIELDS

(75) Inventor: Hideo Tawara, Mie (JP)

(73) Assignee: Sumiden Electronics, Ltd., Hisai, Mie (JP)

( * ) Notice: Subject to any disclaimer, the term of this patent is extended or adjusted under 35 U.S.C. 154(b) by 129 days.

(21) Appl. No.: 11/008,117

(22) Filed: Dec. 10, 2004

(65) Prior Publication Data

US 2005/0127904 A1   Jun. 16, 2005

(30) Foreign Application Priority Data

Dec. 12, 2003  (JP) .............................. 2003-415103

(51) Int. Cl.
   *G01B 7/30*   (2006.01)
(52) U.S. Cl. ............................... 324/207.25; 324/207.2
(58) Field of Classification Search ............................... 324/207.12–207.25
   See application file for complete search history.

(56) References Cited

U.S. PATENT DOCUMENTS

| 5,032,790 A | 7/1991 | Johnson |
| 6,056,909 A | 5/2000 | Wehling et al. |
| 6,155,114 A | 12/2000 | Karino et al. |

FOREIGN PATENT DOCUMENTS

| DE | 43 01 471 A1 | 7/1994 |
| EP | 0 566 946 A1 | 4/1993 |
| EP | 0642 026 A1 | 3/1995 |
| EP | 1 324 048 A1 | 7/2003 |
| JP | 63-157649 | 6/1988 |
| JP | 1-274068 A | 11/1989 |
| JP | 3-12167 U | 2/1991 |

(Continued)

OTHER PUBLICATIONS

Partial European Search Report issued in corresponding patent European Patent Application No. EP 04257673, dated Mar. 9, 2005.

(Continued)

*Primary Examiner*—Jay M. Patidar
(74) *Attorney, Agent, or Firm*—McDermott Will & Emery LLP

(57) ABSTRACT

A magnetic variation sensor includes a magneto-electricity conversion element for picking up variations in magnetic fields and converting the variations picked up into electric signals. A cable is connected to the magneto-electricity conversion element. The magneto-electricity conversion element and a portion of the cable where the cable is connected to the magneto-electricity conversion element are embedded in a resin shell. A mounting piece in the form of a metallic plate is secured to the shell with its portion embedded in the shell. The portion of the mounting piece embedded in the shell is formed with a hole through which the cable passes. The hole includes a radial recess formed along the outer circumference of the hole. The recess is filled with a portion of the resin forming the shell, whereby the resin filling the recess serves to prevent the mounting piece from rotating relative to the shell. The hole has a cutout extending to an outer edge of the mounting piece, whereby the cable can be easily pushed into the hole through the cutout.

4 Claims, 5 Drawing Sheets

FOREIGN PATENT DOCUMENTS

| | | |
|---|---|---|
| JP | 3-130556 U | 12/1991 |
| JP | 4-249123 A | 9/1992 |
| JP | 8-62234 A | 3/1996 |
| JP | 8-105907 A | 4/1996 |
| JP | 9-218215 A | 8/1997 |
| JP | 10-119088 A | 5/1998 |
| JP | 2000-147077 A | 5/2000 |
| JP | 2000-171475 | 6/2000 |
| JP | 2000-357563 A | 12/2000 |
| JP | 2001-174471 | 6/2001 |
| JP | 2002-43897 A | 2/2002 |
| JP | 2002-186129 A | 6/2002 |
| JP | 2003-307523 | 10/2003 |

OTHER PUBLICATIONS

European Search Report issued in corresponding European Patent Application No. EP 04257673, dated May 24, 2005.

Japanese Office action issued in corresponding Japanese Patent application No. JP 2003-415103, dated Nov. 17, 2005.

MAGNETIC VARIATION SENSOR FOR DETECTION OF VARIATION IN MAGNETIC FIELDS

BACKGROUND OF THE INVENTION

This invention relates to a magnetic variation sensor which can be used as a rotational speed sensor such as a vehicle wheel speed sensor or an engine revolution sensor, and a method of manufacturing such a sensor.

A vehicle anti-lock brake system (ABS) needs wheel speed sensors to detect wheel speeds. Typical such wheel speed sensors are magnetic variation sensors. FIG. 7 shows a magnetic variation sensor comprising a sensor unit a for picking up variations in the magnetic flux produced by a ring member B mounted on a portion of a vehicle that rotates together with a vehicle wheel and converting such variations in the magnetic flux into electric signals, and a mounting portion b at which the sensor P is mounted to a stationary part of the vehicle near the ring member B. The sensor unit a may be a Hall IC 1 comprising a Hall element (magneto-electricity conversion element) and a signal processing circuit, or may comprise a coil wound around a bobbin, a pole piece inserted in the bobbin, and a magnet provided at the rear end of the pole piece, as disclosed in (unexamined) JP patent publication 2001-174471.

If the wheel speed sensor P is of the type including the Hall IC 1, the Hall IC picks up variations in the bias magnetic field produced by the ring member B when the ring member B rotates together with the vehicle wheel and converts such variations in the magnetic field into electric signals. In order to produce such variations in the magnetic field corresponding to the rotational speed of the ring member B and thus the vehicle wheel, the sensor P has a magnet and the ring member B is formed of a non-magnetized ferromagnetic (such as iron) encoder. Alternatively, the ring member or encoder B is magnetized such that N and S poles circumferentially alternate with each other. In this case, the magnet of the sensor P is omitted.

As shown in FIG. 7, with a cable 4 connected to the sensor unit a, a resin shell 5 is formed by molding so as to enclose the sensor unit a and the portion of the cable 4 connected to the sensor unit a. When forming the shell 5 by molding a resin, a portion of the resin is formed into a mounting piece 6 that is integral with the shell 5. The sensor P is adapted to be mounted to a vehicle by fastening the mounting piece 6 to a stationary part D of the vehicle by means of e.g. a screw. If the screw is in direct engagement with the mounting piece 6, which is made of a resin, the screw cannot be tightened with sufficient force because the resin forming the mounting piece 6 is low in strength. Thus, (unexamined) JP patent publication 2000-171475 proposes to form a screw (or bolt) hole by embedding a metallic ring 16 in the resin when forming the mounting piece 6 by molding.

The mounting piece 6 is inclined at a predetermined angle with respect to the height direction (direction perpendicular to the plane containing the sheet of FIG. 7) of the sensor unit a according to the position of a stationary part of the vehicle to which the sensor P is to be mounted.

In this arrangement, the shell 5 and the mounting piece 6 cannot be formed simultaneously but have to be formed in separate stages as disclosed in JP patent publication 2000-171475. The manufacturing cost is thus high.

JP patent publication 2003-307523 (unexamined) proposes to form the shell 5 by molding a resin with a portion of a separate member as the mounting piece 6 embedded in the resin so as to form a predetermined angle with respect to the thickness direction of the sensor unit a.

The mounting piece 6 can thus be secured to the shell 5 simultaneously when the shell 5 is formed by molding. But in this arrangement, it is necessary to provide a metallic case in the mold assembly to protect the sensor unit a and also to hold the separate mounting piece 6 in a predetermined angular position when forming the shell by molding a resin. The mold assembly is thus expensive.

An object of the invention is to provide an improved magnetic variation sensor and a method of manufacturing a magnetic variation sensor which makes it possible to form a mounting piece having any desired angle with respect to the shell at a low cost.

SUMMARY OF THE INVENTION

According to this invention, there is provided a magnetic variation sensor comprising a magneto-electricity conversion element for picking up variations in magnetic fields and converting the variations picked up into electric signals, a cable connected to the magneto-electricity conversion element, a resin shell enclosing the magneto-electricity conversion element and a portion of the cable where the cable is connected to the magneto-electricity conversion element, and a mounting piece in the form of a metallic plate secured to the shell with a portion of the mounting piece embedded in the shell, the portion of the mounting piece being formed with a hole through which the cable passes, the hole being provided with an arrangement for preventing the mounting piece from rotating relative to the shell.

Because the hole through which the cable passes has a non-circular shape, the mounting piece will never rotate about the axis of the shell under external forces such as vibrations.

Since the mounting piece itself is formed of a metal, it is not necessary to use the ring disclosed in JP patent publication 2000-171475.

Preferably, the hole includes a radial recess formed in the outer circumference of the hole, the recess being filled with a portion of the resin forming the shell, whereby the resin filling the recess serves to prevent the mounting piece from rotating relative to the shell. The recess has preferably a radially outwardly increasing circumferential width.

With this arrangement, the mounting piece can be rigidly secured to the shell with the least possibility of rotating about the shell.

Preferably, the hole has a cutout extending to an outer edge of the mounting piece, whereby the cable can be easily pushed into the hole through the cutout.

Preferably, the magnetic variation sensor further comprises a holder supporting the magneto-electricity conversion element and embedded in the shell, the magneto-electricity conversion element having terminals connected to the cable, the holder being embedded in the shell together with the magneto-electricity conversion element.

From another aspect of the invention, there is provided a method of manufacturing a magnetic variation sensor comprising the steps of placing a magneto-electricity conversion element for picking up variations in magnetic fields in a mold assembly, holding the magneto-electricity conversion element temporarily in position in the mold assembly, placing a mounting piece in the form of a metallic plate in the mold assembly, holding the mounting piece temporarily in position by bringing at least part of the mounting piece into contact with an inner wall of the mold assembly, pouring a resin into the mold assembly so that the magneto-electricity conversion element and a portion of the mounting piece are embedded in the resin, and allowing the resin to harden, thereby forming a shell enclosing the magneto-electricity element and supporting the mounting plate.

Preferably, the magneto-electricity conversion element is supported on a holder and temporarily held in position in the mold assembly together with the holder. Preferably, the mounting piece has at least two side edges, wherein the mold assembly comprises an upper mold, a lower mold and a pair of partial molds each detachably coupled to one of the upper and lower molds, the mounting piece being temporarily held in position in the mold assembly by bringing each of the two side edges into contact with an inner wall of one of the partial molds.

With this arrangement, since the two side edges of the mounting piece are temporarily held in position by partial molds while the shell is being formed by molding a resin, the mounting piece can be stably held in position.

When the shell is formed by molding a resin, the sensor unit is supported by the holder, and the mounting piece is temporarily held in position by partial molds at any desired inclination angle with respect to the sensor element. Thus, it is not necessary to use a metallic case as needed in JP patent publication 2003-307523.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
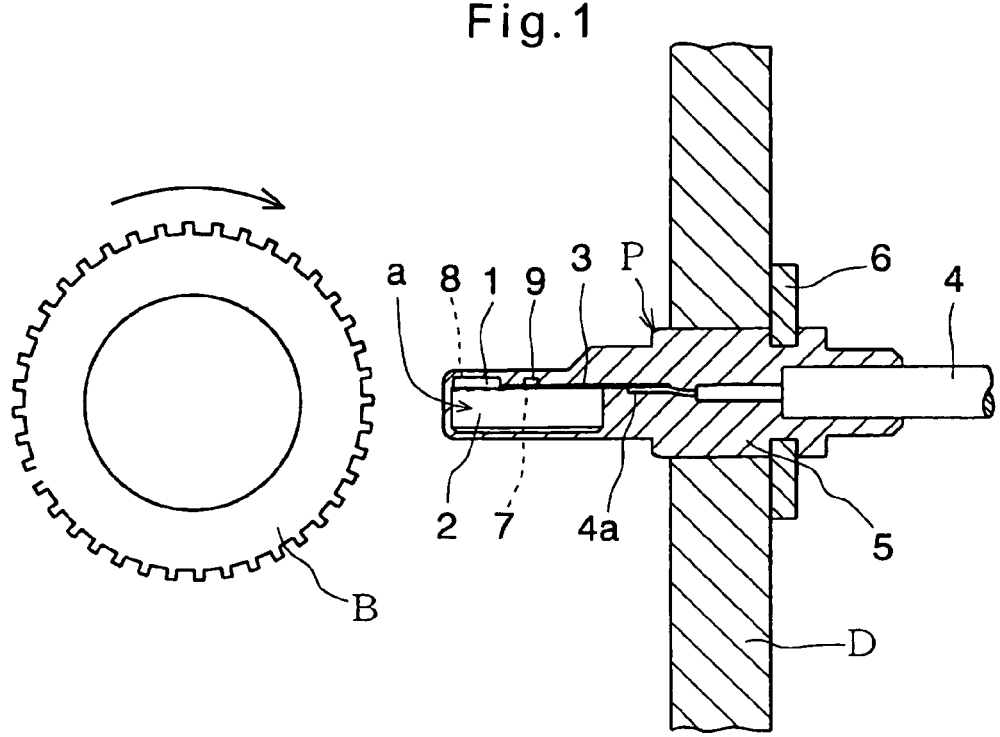
FIG. 1 is a partially cutaway front view of an embodiment of the present invention.
Figure 2:
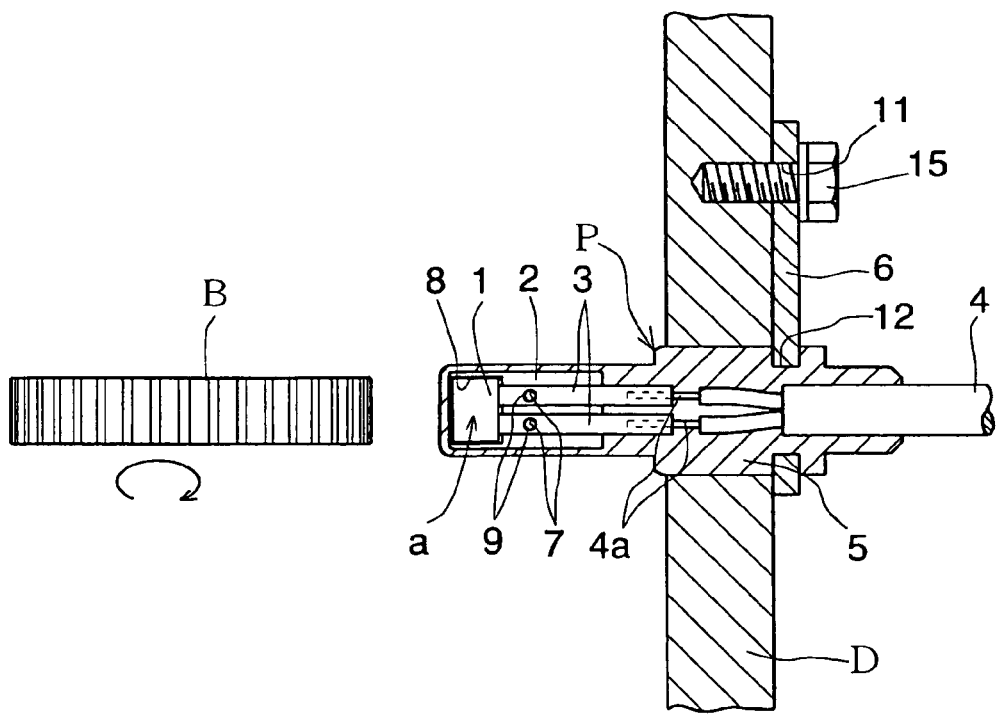
FIG. 2 is a partially cutaway plan view of the embodiment of FIG. 1.

Now referring to FIGS. 1-3, the sensor of this embodiment is a wheel speed sensor P including, as shown in FIGS. 1 and 2, a sensor unit $\underline{a}$ comprising a magneto-electricity conversion element 1 such as a Hall IC supported by a holder 2. The sensor unit $\underline{a}$ is embedded in a shell 5 which is formed by molding a resin after connecting conductors 4a of a cable 4 to respective lead terminals 3 of the magneto-electricity conversion element 1. When molding the resin to form the shell 5, a plate-shaped metallic mounting piece 6 is partly embedded in the resin so that the mounting piece 6 is securely joined to the shell 5 as shown. The sensor P is mounted to a vehicle body by securing the mounting piece 6 to a stationary member D of the vehicle body.

As shown in FIGS. 1 and 2 and as described above, the magneto-electricity conversion element 1 is embedded in the shell 5 together with the plate-shaped terminals 3. The terminals 3 are each formed with a hole 7. The magneto-electricity conversion element 1 is received in a recess 8 formed in the holder 2. The recess 8 is slightly larger than the element 1 so that the element 1 can be received in the recess 8 even if the element 1 is slightly oversized. The holder 2 has protrusions 9 adapted to engage in the holes 7 formed in the terminals 3 when the element 1 is received in the recess 8. With the protrusions 9 engaged in the holes 7, the terminals 3 and thus the magneto-electricity conversion element 1 are held in position.

The conductors 4a of the cable 4 are soldered or welded to the respective terminals 3 before or after the magneto-electricity conversion element 1 has been received in the recess 8 of the holder 2. With the element 1 received in the holder 2 and the conductors 4a connected to the terminals 3, the sensor unit $\underline{a}$, i.e. the magneto-electricity conversion element 1 is set in molds 20 together with the holder 2, and a resin is poured into the molds 20 to form the shell 5. The wheel speed sensor P is thus formed.

Figure 3A:
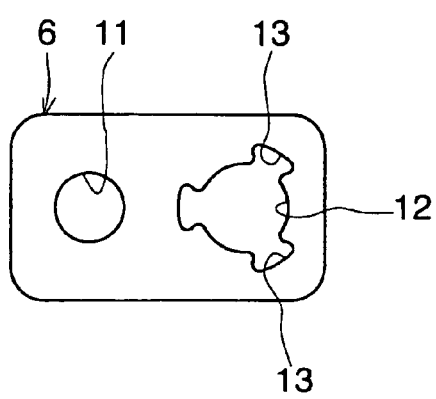
FIG. 3A is a plan view of a mounting piece used in the embodiment of FIG. 1.

The mounting piece 6 may be a rectangular plate as shown in FIG. 3A, a triangular plate or of any other shape. The mounting piece 6 is formed with a screw (or bolt) hole 11 and a hole 12 through which the cable 4 passes. Along the edge of the hole 12, radially outwardly widening recesses 13 are formed. When molding a resin to form the shell 5, part of the resin fills the recesses 13, thus preventing the mounting piece 6 from rotating relative to the shell 5. Since the recesses 13 are radially outwardly widening recesses, once the resin filling the recesses 13 hardens, it can never come out of the recesses 13. Thus, the mounting piece 6 is prevented from not only rotating but from coming out of the shell 5. It does not move relative to the shell, either.

Figure 3B:
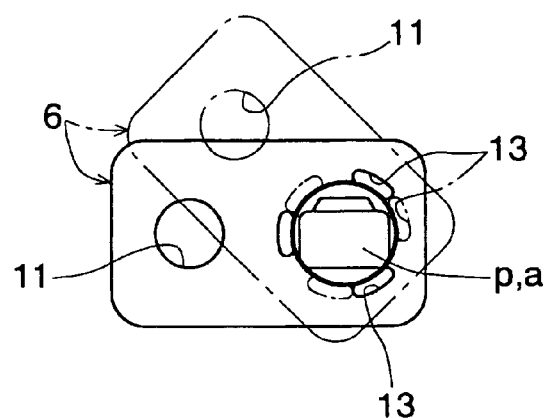
FIG. 3B is a plan view of the mounting piece, as mounted at different inclination angles about the axis of the sensor.

As shown by chain line in FIG. 3B, the shell 5 may be molded with the mounting piece 6 inclined at any desired angle with respect to the height direction of the sensor unit $\underline{a}$.

Figure 5:
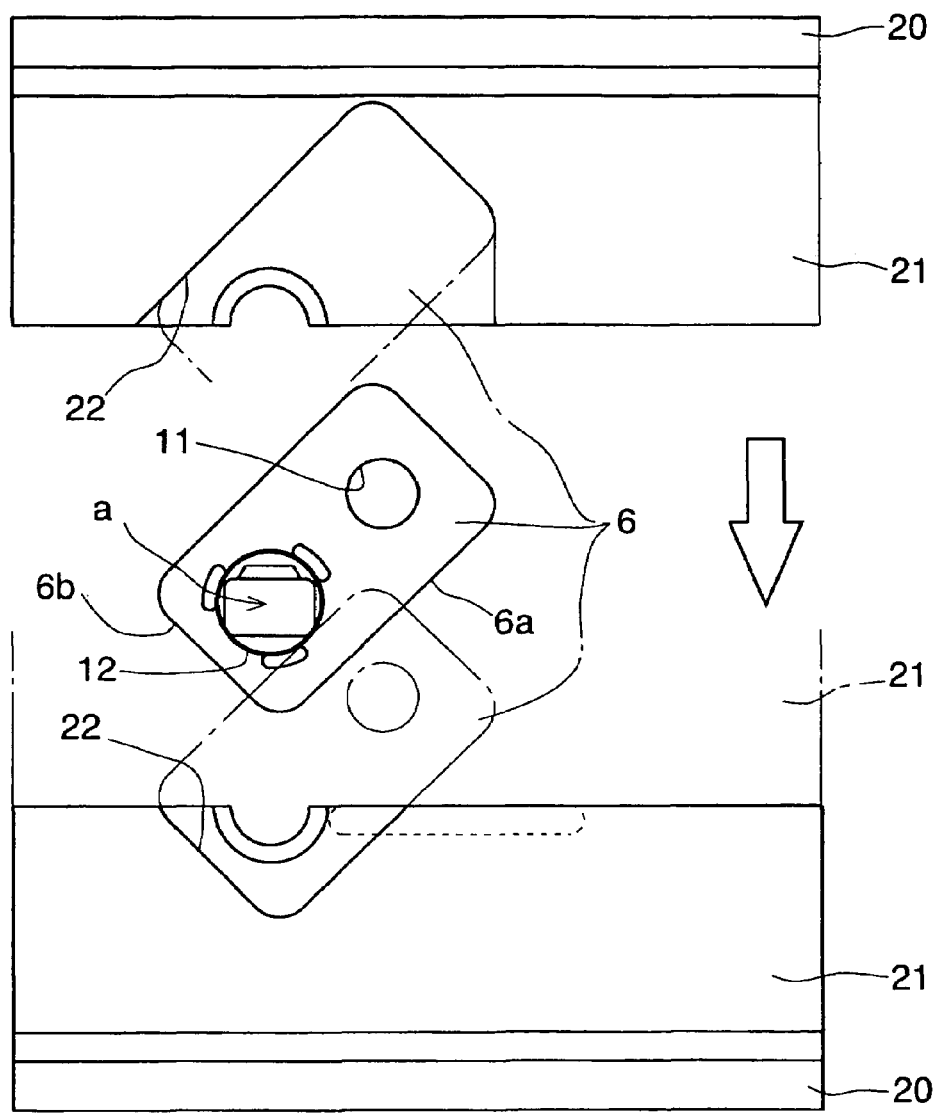
FIG. 5 shows how the sensor according to the present invention is manufactured in a mold assembly.
Figure 6:
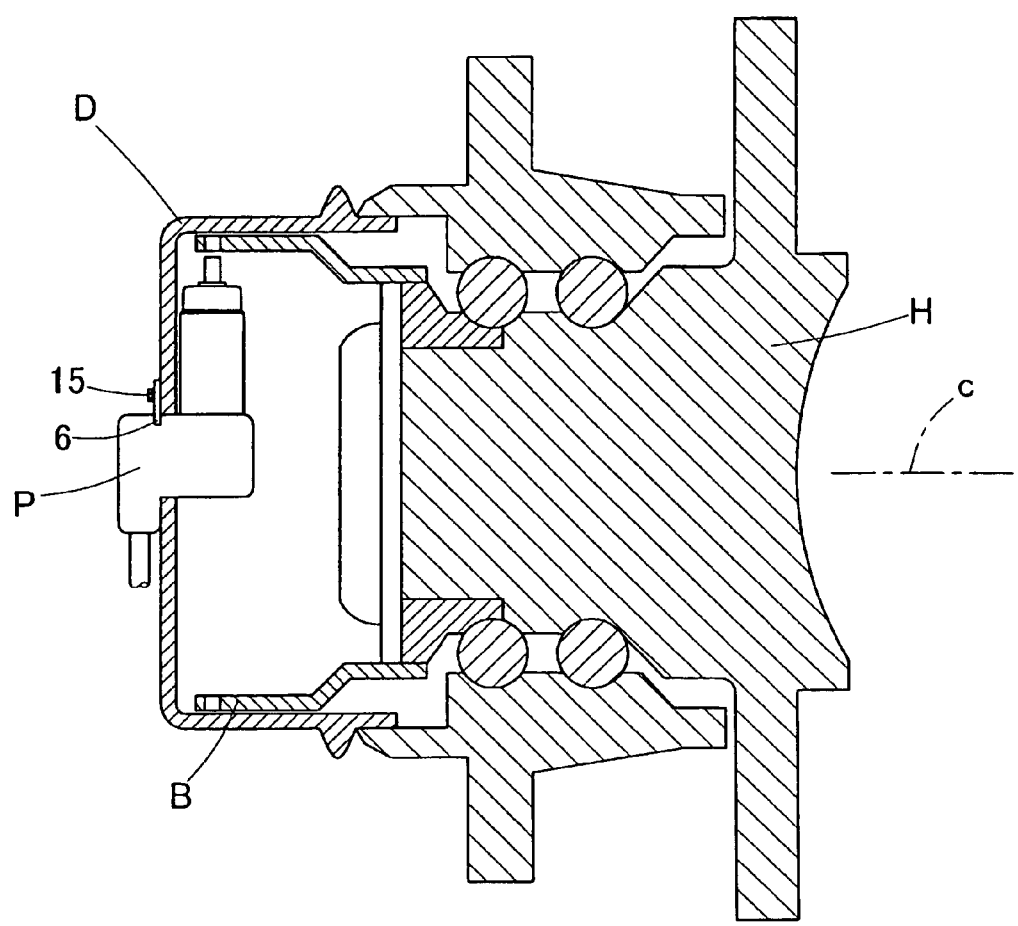
FIG. 6 shows how the sensor according to the present invention is mounted on a wheel hub.
Figure 7:
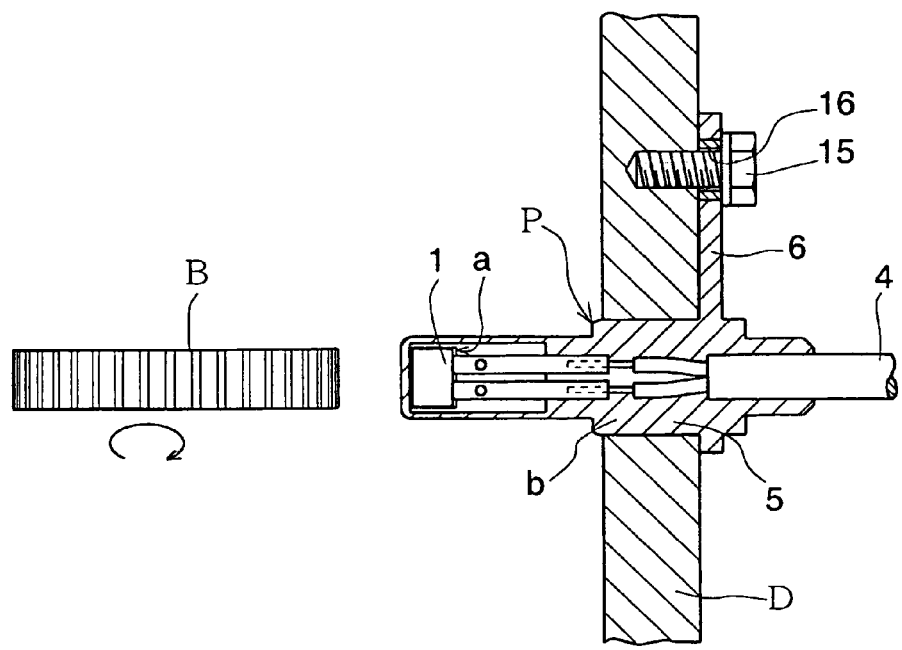
FIG. 7 is a partially cutaway front view of a conventional such sensor.

As shown in FIG. 5, the upper and lower molds 20 used to mold the shell 5 may each include a partial mold 21 inserted in the mold 20 so as to be detachable therefrom. The partial molds 21 of the upper and lower molds 20 are formed with cavities 22 that are inclined at a predetermined angle or not inclined with respect to the height direction of the sensor unit $\underline{a}$ so that the mounting piece 6 can be received in the cavities 22. A plurality of sets of such partial molds 21 are prepared, each set being formed with cavities 22 inclined at a different angle from the cavities 22 of the other sets. According to the desired inclination angle of the mounting piece 6 with respect to the height direction of sensor unit $\underline{a}$, a suitable partial mold set is selected and mounted to the upper and lower molds 20.

If the mounting piece 6 is a rectangular plate, a plurality of sets of partial molds 21 are prepared, each set being formed with cavities 22 having sides complementary to the long and short sides 6a and 6b of the rectangle and inclined at a different angle from the cavities 22 of the other set. To mold the shell 5, a desired partial mold set is selected and mounted to the upper and lower molds 20. The mounting piece 6 is set in the molds 20 together with the sensor unit $\underline{a}$ and other parts so that its long and short sides 6a and 6b are supported on the corresponding sides of the cavities 22. The mounting piece 6 can thus be set stably and accurately in the molds.

Figure 4A:
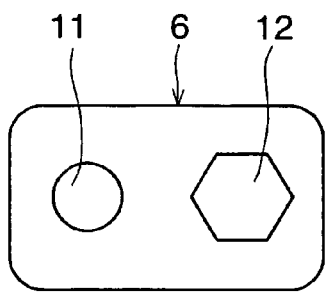
FIGS. 4A and 4B are plan views of different mounting pieces.
Figure 4B:
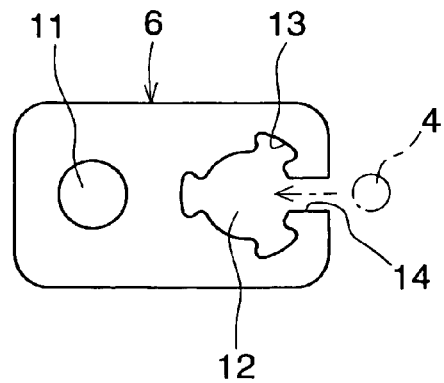

The hole 12 formed in the mounting piece 6 is preferably non-circular so that the mounting piece 6 cannot rotate relative to the shell 5. For example, the hole 12 may have a polygonal (such as hexagonal) cross-section as shown in FIG. 4A. As shown in FIG. 4B, the hole 12 may have a cutout 14 extending to one side edge of the mounting piece 6 so that the cable 4 can be pushed through the cutout 14 into the hole 12 as shown by the arrow (in phantom line) in FIG. 4B.

As shown in FIG. 1, the wheel speed sensor P is mounted on a stationary part of a vehicle so that the magneto-electricity conversion element 1 opposes a target member B such as a sensor rotor mounted on an axle. When the target member B rotates, the magneto-electricity conversion element 1 picks up variations in the magnetic field produced by the target member B corresponding to the rotational speed of the target member B and converts the variations in the magnetic field into electric signals. The electric signals are transmitted through the terminals 3 and the cable 4 and entered into a control unit of e.g. an ABS. Based on the signals, the control unit detects (calculates) the rpm of the target member B and thus the rpm of the vehicle wheel.

While the magneto-electricity conversion element of the embodiment is a Hall IC, it may be an electromagnetic pickup using a coil. The magnetic variation sensor of the invention is not limited to a wheel speed sensor but may be a different type of sensor.

The wheel speed sensor P is mounted on a vehicle in the same manner as conventional wheel speed sensors. For example, especially if the sensor unit a is an electromagnetic pickup, the sensor P is preferably mounted on a hub cap D so that its longitudinal axis extends perpendicular to the axis c of a wheel hub H with its sensor unit a opposing the sensor rotor B, which is coaxially mounted on the wheel hub H.

What is claimed is:

1. A magnetic variation sensor comprising a magneto-electricity conversion element for picking up variations in magnetic fields and converting the variations picked up into electric signals, a cable connected to said magneto-electricity conversion element, a resin shell enclosing said magneto-electricity conversion element and a portion of said cable where said cable is connected to said magneto-electricity conversion element, and a mounting piece in the form of a metallic plate secured to said shell with a portion of said mounting piece embedded in said shell, said portion of said mounting piece being formed with a hole through which said cable passes, said hole having a non-circular cross-section, whereby said mounting piece is prevented from rotating relative to said shell, wherein said hole has a cutout extending to an outer edge of said mounting piece, whereby said cable can be pushed into said hole through said cutout, and said cutout has a width smaller than a length of a line extending between opposite walls of the hole through, and perpendicular to, a center axis of the hole.

2. The magnetic variation sensor of claim 1 wherein said hole includes a radial recess formed in the outer circumference of said hole, said recess being filled with a portion of the resin forming said shell, whereby the resin filling said recess serves to prevent said mounting piece from rotating relative to said shell.

3. The magnetic variation sensor of claim 2 wherein said recess has a radially outwardly increasing circumferential width.

4. The magnetic variation sensor of claim 1 further comprising a holder supporting said magneto-electricity conversion element and embedded in said shell, said magneto-electricity conversion element having terminals connected to said cable, said holder being embedded in said shell together with said magneto-electricity conversion element.

* * * * *